United States Patent
Xian et al.

(10) Patent No.: US 9,773,139 B2
(45) Date of Patent: Sep. 26, 2017

(54) APPARATUS COMPRISING LIGHT SENSING ASSEMBLIES WITH RANGE ASSISTED GAIN CONTROL

(71) Applicant: Hand Held Products, Inc., Fort Mill, SC (US)

(72) Inventors: Tao Xian, Mount Laurel, NJ (US); Timothy Good, Charlotte, NC (US); Ynjiun Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/288,109

(22) Filed: Oct. 7, 2016

(65) Prior Publication Data

US 2017/0024592 A1 Jan. 26, 2017

Related U.S. Application Data

(63) Continuation of application No. 13/743,063, filed on Jan. 16, 2013, now Pat. No. 9,465,967.

(60) Provisional application No. 61/726,385, filed on Nov. 14, 2012.

(51) Int. Cl.
*G06K 7/10* (2006.01)

(52) U.S. Cl.
CPC ..... *G06K 7/10564* (2013.01); *G06K 7/10732* (2013.01); *G06K 7/10752* (2013.01); *G06K 7/10792* (2013.01); *G06K 7/10801* (2013.01); *G06K 7/10811* (2013.01); *G06K 7/10851* (2013.01)

(58) Field of Classification Search
CPC ........... G06K 7/10792; G06K 7/10801; G06K 7/10811

USPC ............................................. 235/462.26, 470
See application file for complete search history.

(56) References Cited

U.S. PATENT DOCUMENTS

| | | | |
|---|---|---|---|
| 5,378,883 A | 1/1995 | Batterman et al. |
| 5,598,007 A | 1/1997 | Bunce et al. |
| 5,612,529 A | 3/1997 | Coleman |
| 5,811,774 A | 9/1998 | Ju et al. |
| 5,818,528 A | 10/1998 | Roth et al. |
| 5,914,478 A | 6/1999 | Bridgelall |
| 6,073,848 A | 6/2000 | Giebel |
| 6,478,225 B1 | 11/2002 | Swartz et al. |
| 6,695,209 B1 | 2/2004 | La |
| 7,589,316 B2 | 9/2009 | Dunki-Jacobs |
| 7,594,608 B2 | 9/2009 | Knowles et al. |
| 7,690,572 B2 | 4/2010 | Meier et al. |
| 7,712,666 B2 | 5/2010 | Kotlarsky et al. |
| 7,740,176 B2 | 6/2010 | Wang et al. |
| 7,743,993 B2 | 6/2010 | Kolstad et al. |
| 7,832,644 B2 | 11/2010 | Kolstad et al. |
| 7,874,485 B2 | 1/2011 | Meier et al. |
| 8,028,917 B2 | 10/2011 | Giebel |

(Continued)

*Primary Examiner* — Toan Ly
(74) *Attorney, Agent, or Firm* — Additon, Higgins & Pendleton, P.A.

(57) ABSTRACT

There is set forth herein an indicia reading apparatus comprising two or more light sensing assemblies. In one embodiment, the indicia reading apparatus can comprise a linear light sensing assembly and an area light sensing assembly, and can be operative to determine the range between the apparatus and the indicia. In one embodiment, the indicia reading apparatus can be operative to apply a range-assisted gain to the data output by one or more of the linear light sensing assembly and the area light sensing assembly to increase the likelihood of indicia reading and improve expected indicia read time.

20 Claims, 5 Drawing Sheets

(56) References Cited

U.S. PATENT DOCUMENTS

| | | |
|---|---|---|
| 8,074,887 B2 | 12/2011 | Havens et al. |
| 9,465,967 B2 | 10/2016 | Xian et al. |
| 2001/0027995 A1 | 10/2001 | Patel et al. |
| 2002/0011557 A1 | 1/2002 | Ahten et al. |
| 2004/0004127 A1 | 1/2004 | Nakamura et al. |
| 2005/0230480 A1 | 10/2005 | Kolstad et al. |
| 2007/0040035 A1 | 2/2007 | Kotlarsky et al. |
| 2007/0158426 A1 | 7/2007 | Kolstad et al. |
| 2007/0164115 A1 | 7/2007 | Joseph et al. |
| 2007/0170260 A1 | 7/2007 | Kolstad et al. |
| 2007/0215707 A1 | 9/2007 | Kolstad et al. |
| 2009/0095047 A1 | 4/2009 | Patel et al. |
| 2011/0036908 A1 | 2/2011 | Havens et al. |

APPARATUS COMPRISING LIGHT SENSING ASSEMBLIES WITH RANGE ASSISTED GAIN CONTROL

CROSS-REFERENCE TO RELATED APPLICATIONS

The present application claims the benefit of U.S. patent application Ser. No. 13/743,063 for an Apparatus Comprising Light Sensing Assemblies with Range Assisted Gain Control filed Jan. 16, 2013 (and published May 15, 2014 as U.S. Patent Publication No. 2014/0131448), now U.S. Pat. No. 9,465,967, which claims the benefit of U.S. Provisional Application No. 61/726,385 for an Apparatus Comprising Light Sensing Assemblies with Range Assisted Gain Control filed Nov. 14, 2012. Each of the foregoing patent applications, patent publication, and patent is hereby incorporated by reference in its entirety.

FIELD OF THE INVENTION

The present invention relates in general to an apparatus having a light sensing assembly, and particularly is related to an apparatus with two or more light sensing assemblies.

BACKGROUND

Apparatus having light sensing assemblies including light sensing assemblies comprising image sensor arrays are available in a variety of forms, including digital cameras, mobile phones, surveillance equipment, medical diagnostic equipment, and indicia decoding apparatus. Apparatus having light sensing assemblies are available in forms with indicia decoding capability and without decoding capability. Apparatus with indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display. Keyboard and display equipped indicia reading apparatus are commonly used in retail, shipping and warehouse applications. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

Some indicia reading apparatuses are particularly suited for reading indicia at relatively short ranges, some indicia reading apparatus are particularly suited for reading indicia at relatively long ranges, while some indicia reading apparatus are particularly suited for reading indicia at differing ranges.

SUMMARY

There is set forth herein an indicia reading apparatus comprising two or more light sensing assemblies for reading an indicia. In one embodiment, the indicia reading apparatus can comprise a linear light sensing assembly and an area light sensing assembly, and can be operative to determine the range between the apparatus and the indicia and provide gain to the signals produced by one or more of the light sensing assemblies based on the range.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION

Figure 1:
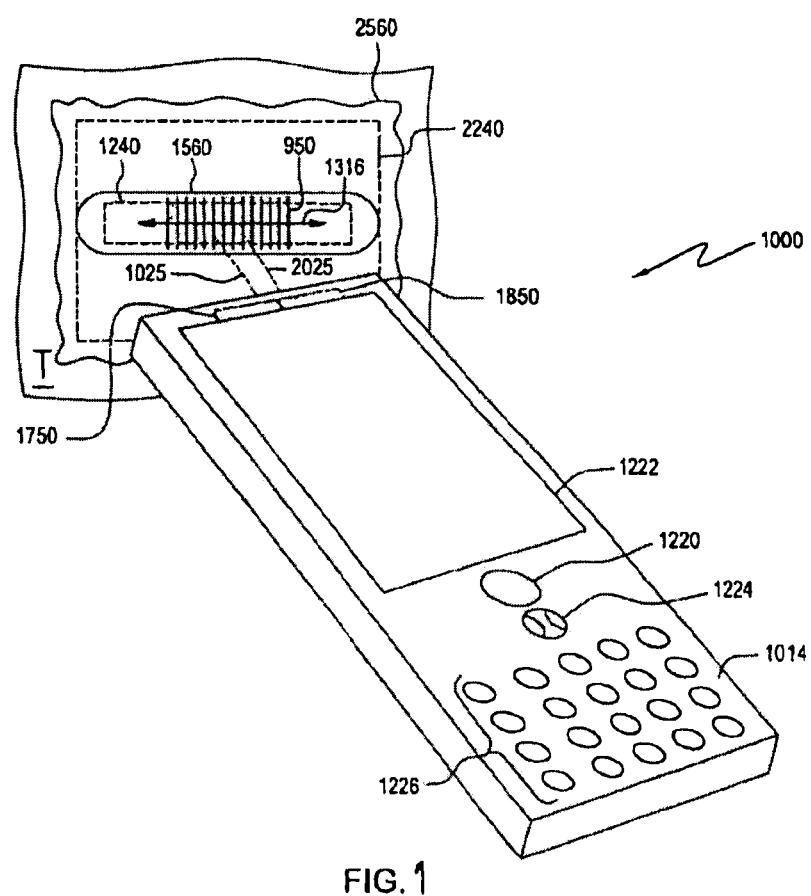
FIG. 1 is a schematic physical form view of a hand held indicia reading apparatus in one embodiment illustrating the apparatus in use for reading a displayed indicia.

There is set forth herein an indicia reading apparatus comprising two or more light sensing assemblies. In one embodiment, the indicia reading apparatus can comprise a linear light sensing assembly and an area light sensing assembly, and can be operative to determine the range between the apparatus and the indicia to increase the likelihood of indicia reading and improve expected indicia read time.

In one embodiment, there is set forth herein an indicia reading apparatus having a linear scanning based light sensing assembly and an area light sensing assembly. The apparatus can be operative in a first configuration wherein the linear light sensing assembly system is active. In some embodiments, when active, the linear light sensing assembly may utilize light from a light source to generate a light pattern (regardless of its source) that includes a position or size that can be effective in determining range via the area light sensing assembly, as described below. For example, the linear light sensing assembly may utilize light from a light source and generate a substantially planar beam(s) effective in range determination with the area light sensing assembly.

In some embodiments, the light source may be a laser light source and the linear light sensing assembly can utilize the laser source to project a beam(s) of laser light onto and/or about a decodable indicia. In some other embodiments, when active, the linear light sensing assembly can utilize a linear illumination source other than a laser, such as on more LEDs, to project a beam of light onto and/or about a decodable indicia. The apparatus can utilize a detector of the linear light sensing assembly to detect the light returning from and/or about the indicia and output signals, which can be processed to read and decode the decodable indicia. The apparatus can also utilize the area light sensing assembly to capture at least one area frame of image data. The at least one frame of area image data can contain image data corresponding to a field of view of the area light sensing assembly during a particular exposure time, including a representation of a decodable indicia and a representation of at least the light pattern emitted from the linear light sensing assembly. Therefore, during frame exposure periods with the light source of the linear light sensing assembly, the area light sensing assembly can output area image data that includes data corresponding to the representation of the light pattern from the linear light sensing assembly, such as the area of the representation of the light pattern in the area frame and the location of the light pattern with respect to the center of the area frame, for example. The at least one area frame of image data can also contain image data corresponding to the decodable indicia, which can be processed to read and decode the decodable indicia.

In a first configuration, the apparatus can utilize the data of an image data frame corresponding to the area or location of the representation of the light pattern from the linear light sensing assembly (e.g., laser light or illumination) to determine, via calculation and/or table lookup, a range between the apparatus and the decodable indicia (assuming the light is reflecting off the indicia or substrate carrying the indicia), such as the linear distance between the decodable indicia and the detector of the linear light sensing assembly and/or an image sensor array of the area light sensing assembly. Similarly, in the first configuration, the apparatus can determine, via calculation and/or table lookup, a gain value to be applied to a signal being output from the linear light sensing assembly and/or the signal being output from the area light sensing assembly to more quickly and accurately read and decode the decodable indicia as compared to when the gain value was not applied to the signal or a different gain value was applied to the signal. In this way, the apparatus can adjust the gain applied to the signal output from the linear light sensing assembly and/or area light sensing assembly based on the range, or change of range, of the apparatus from a decodable indicia to increase the likelihood of indicia reading and improve expected indicia read time.

Figure 2:
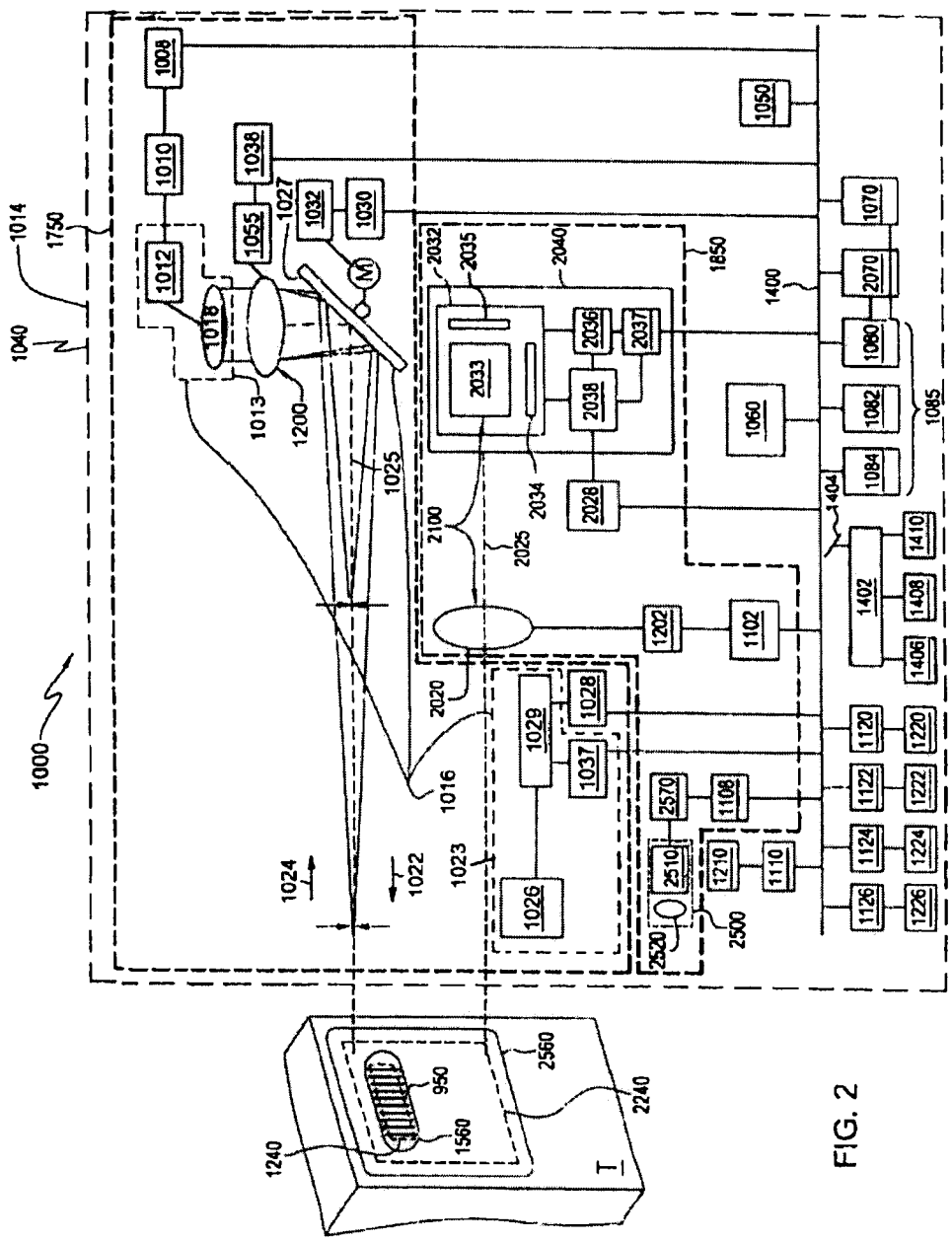
FIG. 2 is a block diagram of an indicia reading apparatus in one embodiment.

There is set forth herein as shown in FIG. 1, an indicia reading apparatus 1000 having linear light sensing assembly 1750 an area light sensing assembly 1850 including an area image sensor array 2033 (FIG. 2). The linear light sensing assembly 1750 can output signal representing a line (a linear area, e.g. h<<w) in a target space and the area imaging system 1850 can output a signal representing an area of a target space, as shown in FIGS. 1-3C. Linear light sensing assembly 1750 and area light sensing assembly 1850 can include respective axes 1025, 2025. In some embodiments, the apparatus 1000 can be operative in a first configuration and project a laser beam utilizing the linear light sensing assembly 1750 at a decodable indicia, as shown in FIG. 1. In some other embodiments, the apparatus 1000 can be operative in a first configuration and project linear illumination utilizing the linear light sensing assembly 1750 at decodable indicia, as shown in FIG. 1. During a period in which the laser beam or illumination is active, the apparatus 1000 can utilize the area light sensing assembly 1850 to capture area image data that includes a representation of the area and/or location of the light pattern (e.g., a laser beam or illumination) of the linear light sensing assembly 1750 (assuming the light pattern is projected in the field of view of the are imaging system 1850) to determine the range of the apparatus 1000 to the decodable indicia, as show in FIG. 3A-C. The apparatus 1000 can utilize the range information to determine a suitable gain to apply to the linear signal and/or the signal output by the area light sensing assembly to more quickly provide accurate decoy of decodable indicia as compared to when the gain is not applied, or a different gain is applied.

An exemplary hardware platform for support of operations described herein with reference to a sensor based indicia reading apparatus 1000 is shown and described with reference to FIG. 2. In the course of operation of apparatus 1000, signals in the form of analog signals can be read out of the linear light sensing assembly 1750 and the area light sensing assembly 1850, amplified, converted into digital signals, and stored into a system memory such as RAM 1080. As shown in FIG. 2, a memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out digital signal data stored in memory 1080 and subject such digital signal to various processing algorithms. Apparatus 1000 can include a direct memory access unit (DMA) 1070 for routing signals read out from linear light sensing assembly 1750, or from area light sensing system 1850, that has been subject to conversion to RAM 1080. In another embodiment, apparatus 1000 can employ a system bus 1040 for bus arbitration mechanism (e.g., a PCI bus), thus eliminating the need for a central DMA controller, as illustrated in FIG. 2. Apparatus 1000 can include alternative embodiments of the system bus architecture and/or direct memory access components providing for efficient data transfer between the RAM 1080 and the linear light sensing assembly 1750 and the area light sensing assembly 1850.

As can be seen in FIGS. 1 and 3A-C, for attempting to decode a bar code symbol, e.g., a one dimensional bar code symbol, CPU 1060 can process a signal corresponding to reflected light of the light pattern (e.g., a signal corresponding to a scan path or plane/line 1316 or thin-lines illumination 1560) of the linear light sensing assembly 1750) or a signal corresponding to a field of view 2240 of the area light sensing assembly 1850 to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. As also shown in FIGS. 1-3C, apparatus 1000 can capture an area frame of image data utilizing area light sensing assembly 1850 having area imaging assembly 2100 including area image sensor array 2033 and can output a signal representing including a representation of the projected light pattern of the linear light sensing assembly, as shown in FIGS. 1 and 2.

In another aspect, as shown in FIG. 2, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 e.g., USB, RS232, and/or AC/DC transformer 1410). Further regarding power input unit 1570, power input unit can include a charging capacitor that is continually charged by power supply 1402. Power input unit 1570 can be configured to output energy within a range of energization levels.

As shown in FIG. 2, in some embodiments the linear light sensing assembly 1750 may be a laser scanner based linear light sensing assembly. Laser scanning based linear light sensing assembly 1750 can be disposed within one of a hand held housing 1014, as shown in FIG. 1, or a fixed mount housing (not shown). For example, the linear light sensing assembly 1750 may be a laser scanner based linear light sensing assembly that is configured to emit a scanning laser beam that sweeps along a plane. In such exemplary embodiments, the exposure time of the area light sensing assembly 1850 (if applicable) may be synchronized with the sweep of the beam such that the beam is imaged thereby. As another example, the linear light sensing assembly 1750 may be a laser scanner based linear light sensing assembly that is configured to emit a static laser beam that is focused in one dimension and expanded in the perpendicular dimension to form an expanding plane of light (i.e., a static plane/line of laser light).

In some other embodiments the linear light sensing assembly 1750 may be at least one linear imagining and illumination based linear light sensing assembly 1750, such as a system including an image sensor 2032 with a linear field of view 1240 and a thin-lined illumination pattern 1560 as discussed further below with respect to the area imaging system 1850. For example, the linear light sensing assembly 1750 may be configured to emit a focused/expanded beam of light using one more LEDs for its source.

It is particularly noted, however, that any configuration of the linear light sensing assembly 1750 that utilizes light from any source(s) and generates at least one planar or other shaped light pattern effective for ranging by way of an area light sensing assembly 1850, as described below, may be used. For example, any configuration of the linear light sensing assembly 1750 that utilizes light from any source and generates a planar beam of light that includes a dimension (e.g., width or thickness) projected in the field of view of the area light sensing assembly 1850 that can be used for range determination may be used. Similarly, as another example any configuration of the linear light sensing assembly 1750 that utilizes light from any source and generates a planar beam(s) projected in the field of view of the area light sensing assembly 1850 in a particular position that that can be used for range determination may be used.

As shown in FIG. 1, the indicia reading apparatus 1000 can be defined within a hand held housing 1014. The hand held housing 1014 may include manually engageable members to facilitate use of the apparatus 1000. In the exemplary illustrated embodiment shown in FIG. 1, the apparatus 1000 can include a trigger 1220 which may be used to make active a trigger signal for activating linear readout, frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of reflected light emitted from the linear light sensing assembly 1750 can be captured by way of read out of signals from detector assembly 1023 (as shown in FIG. 2), and a succession of frames from area light sensing assembly 1850 can be captured by way of read out of signals from image sensor array 2033 (as shown in FIG. 2), and then storage of the signals in the form of digital signals after conversion into memory 1080 (which can buffer one or more of the succession of frames and light beams at a given time). CPU 1060 can be operative to determine the range of the indicia being targeted, and determine and apply a corresponding gain to signal output by either of the linear light sensing assembly 1750 and the area light sensing assembly 1850. CPU 1060 can also be operative to subject one or more of the succession of signals representing reflected light and area frames to a decode attempt after range-assisted gain has been applied thereto, to a decode attempt.

In addition to trigger 1220, display 1222, pointer mechanism 1224, and keyboard 1226 can be disposed on a common side of a hand held housing 1014, as shown in FIG. 1. Display 1222, trigger 1220 and pointer mechanism 1224 in combination can be regarded as a user interface of apparatus 1000. Display 1222 in one embodiment can incorporate a touch panel for navigation and virtual actuator selection in which case a user interface of apparatus 1000 can be provided by display 1222. A user interface of apparatus 1000 can also be provided by configuring apparatus 1000 to be operative to be reprogrammed by decoding of programming bar code symbols. A hand held housing 1014 for apparatus 1000 can in another embodiment be devoid of a display and can be in a gun style form factor. Linear light sensing assembly 1750 and area light sensing assembly 1850 (including area illumination assembly 2500 and area imaging assembly 2100 (as shown in FIG. 2)) can be disposed in hand held housing 1014. In another exemplary embodiment (not shown), indicia reading apparatus 1000 may have a fixed mount housing and light sensing assemblies 1750 and 1850 may be disposed in the housing, such as a point of sale apparatus. For example, the apparatus 1000 may be fixedly mounted in a fixed position at a checkout counter. As another example, indicia reading apparatus 1000 may be fixedly mounted at a ceiling above a conveyor belt. In another exemplary embodiment (not shown), apparatus 1000 can be devoid of a housing, such as housing 1014. For example, the elements of FIG. 2 depicted as being within dashed borders 1014 and 1015 can be disposed with a housing, e.g., housing 1014, or be disposed without a housing.

Referring to FIGS. 1 and 2, in some embodiments the linear light sensing assembly 1750 may be a laser scanning based linear light sensing assembly 1750 that includes a laser source 1012. The laser source 1012 may be operable to emit a laser beam along an optical path or axis 1025. Laser source 1012 can be coupled to laser source control circuit 1010, as shown in FIG. 2. Light from laser source 1012 can be shaped by collimating optics 1018. Light shaped by collimating optics 1018 can be further shaped by lens assembly 1200. As indicated in FIG. 2, the combination of laser source 1012 and collimating optics 1018 can be regarded as a laser diode assembly 1013. The laser beam travels in an emitting direction 1022 along axis 1025 and illuminates a target T, which in one embodiment includes decodable indicia e.g., a bar code symbol. A scanning mirror reflector 1027 may be disposed within the optical path defined by axis 1025 which oscillates to direct the laser beam across the entire surface to be scanned, as illustrated in FIG. 2. As also shown in FIG. 2, reflector 1027 can be driven by scan motor, M, which can be coupled to a control circuit 1032. A laser scanning assembly 1016 in one embodiment can include laser diode assembly 1013, reflector 1027 and detector assembly 1023. A field of view of laser scanning assembly 1016 can be regarded to be a scan path 1316 of a light beam projected on a target T during a scan, as shown in FIG. 1. In other embodiments, the laser scanning assembly 1016 may not include the scanning mirror reflector 1027 and associated scanning components (i.e., the laser scanning assembly 1016 may not be configured to sweep or scan the laser light). In some such embodiments, the laser scanning assembly 1016 may be configured to project a static laser beam that is focused in one direction and expanded in another direction (e.g., a substantially perpendicular direction) to form an expanded plane or line of light (i.e., the light pattern of the linear light sensing assembly 1750).

In the illustrated embodiment, the laser beam may reflect off the target T and travel along axis 1025 in a receiving direction 1024 back to a detector assembly 1023, as indicated in FIGS. 1 and 2. In an example wherein the target T includes a barcode, the incident laser light strikes areas of dark and white bands and is reflected. The reflected beam may thusly have variable intensity representative of the barcode pattern. Detector assembly 1023, including detector 1026, amplifier circuitry 1029 (amplifier) and analog to digital converter 1037, can receive the reflected beam of variable intensity, generate an analog signal corresponding to the reflected beam, amplify the analog signal by increasing the power or amplitude of the signal (i.e., providing gain), and convert it to a digital signal for storage into memory 1080 where it can be processed by CPU 1060 in accordance with a program stored in non-volatile memory 1082, provided in a particular example by an EPROM. While linear light sensing assembly 1750 is depicted as including a certain number of elements, the system can be provisioned with fewer than or greater than the depicted number of elements.

For attempting to decode a bar code symbol, CPU 1060 can process a signal, such as an analog or digital signal, corresponding to a scanned, reflected, and detected laser beam projected along a scan path or a plane/line 1316 to determine a spatial pattern of dark cells and light cells, and can convert each light and dark cell pattern determined into a character of a character string via table lookup. As illustrated in FIG. 2, apparatus 1000 can include various interface circuits allowing CPU 1060 to communicate with various circuits of the laser scanning based linear light sensing assembly 1750 of apparatus 1000 via system bus 1400, including interface circuit 1008 coupled to laser source control circuit 1010 and system bus 1400, interface circuit 1030 coupled to motor control circuit 1032, and interface circuit 1038 coupled to electrical power input unit 1055.

Another example of an interface circuit for providing control signals to a laser scanning based linear light sensing assembly 1750 of apparatus 1000 is interface circuit 1028 coupled to the amplifier 1029, as shown in FIG. 2. The interface circuit 1028 can be used for controlling the gain applied by the amplifier 2036. For example, at the determination of CPU 1060, the CPU 1060 can provide gain signals to the linear light sensing assembly amplifier 1036 via interface circuit 1028 to apply a particular gain to the analog signal output by the detector 1029. As explained in further detail below, the CPU 1060 may determine the range of the apparatus 1000 to a particular indicia via signals output by the area light sensing assembly 1850, and based on that range the CPU 1060 may determine an appropriate gain level, such as via a lookup table, and send a corresponding gain signal to the amplifier 1029 via the interface circuit 1028 (which may be greater, less or the same amount of gain already being applied to the analog signal by the amplifier 1029, if an amount of gain is being provided). In particular, for example, if the apparatus 1000 is moved from a first position where the apparatus 1000 is at a first range from an indicia, to a second position where the apparatus 1000 is at a second range from the indicia that is greater than the first range, the CPU 1060 may determine the new greater range and instruct the amplifier 1029 via the interface circuit 1028 to apply an appropriate gain value, such as a gain value that is greater than the gain value applied at the first position.

As shown in FIGS. 1 and 2, indicia reading apparatus 1000 can include an area light sensing assembly 1850 including an area image sensor 2032 comprising a multiple pixel image sensor array 2033 having pixels arranged in rows and columns of pixels, associated column circuitry 2034 and row circuitry 2035. Associated with the image sensor 2032 can be amplifier circuitry 2036 (amplifier), and an analog to digital converter 2037 which converts output signals representative of light incident on image sensor array 1033 in the form of analog signals read out of image sensor array 2033 into signals in the form of digital signals, as shown in FIG. 2. Image sensor 2032 can also have an associated timing and control circuit 2038 for use in controlling, for example, the gain applied by the amplifier 2036 and/or the exposure period of image sensor 2032. As illustrated in FIG. 2, the noted circuit components 2032, 2036, 2037, and 2038 can be packaged into a common image sensor integrated circuit 2040. Image sensor integrated circuit 2040 can incorporate fewer than the noted number of components. In one example, image sensor integrated circuit 2040 can be provided e.g., by an MT9V022 (752×480 pixel array) or an MT9V023 (752×480 pixel array) image sensor integrated circuit available from Micron Technology, Inc. In one example, image sensor array 2033 can be a hybrid monochrome and color image sensor array having a first subset of monochrome pixels without color filter elements and a second subset of color pixels having color sensitive filter elements. In one example, image sensor integrated circuit 2040 can incorporate a Bayer pattern filter, so that defined at the image sensor array 2033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging assembly 2010 of apparatus 1000 can include image sensor 2032 and a lens assembly 2020 for focusing an image onto image sensor array 2033 of image sensor 2032, as illustrated in FIG. 2.

As shown in FIGS. 1 and 2, the field of view 2240 of area imaging system 1850 can define an area that is proximate to, but smaller than, an area defined by a projected illumination pattern 2560 (at a particular range). In some embodiments, however, the field of view 2240 of the area imaging system 1850, such as the field of view of the area image sensor 2032, can define an area that is larger than an area defined by a projected illumination pattern 2560 (at a particular range). As also shown in FIGS. 1 and 2, the height and width of the field of view 2240 of the area imaging system 1850 may be similar in size. For example, some exemplary embodiments may include an area imaging system 1850 with at least a similar number of rows and columns of pixels, such as an image sensor array 2033 with a similar number of rows and columns of pixels.

As also illustrated in FIGS. 1 and 2, the field of view 2240 of the area imaging system 1850 may include width and height dimensions that differ from each other, such as the illustrated linear field of view 1240 including height and width dimensions that are substantially different. As shown in FIGS. 1 and 2, in some embodiments the height of the field of view 1240 of the area imaging system 1850, such as the field of view of the area image sensor 2032, may be substantially less than the width of the field of view 1240 of the area imaging system 1850 (e.g., the image sensor 2032 may be a linear imaging sensor). For example, some exemplary embodiments may include an image sensor 2032 with substantially more columns of pixels than rows of pixels, such as including multiple columns of pixels and a lesser number of rows of pixels, such as a single row of pixels. As described below, such a linear-type field of view 1240 of the area imaging system 1850 may be used in conjunction with a thin-lined illumination pattern 1560.

As described above, the linear light sensing assembly 1750 may be such a linear-type area imaging system with a linear field of view 1240 in conjunction with a thin-lined illumination pattern 1560. In such an embodiment, the area imaging system 1850 may include an area field of view 2240 larger than the thin-lined illumination pattern 1560 (and potentially the linear-type area field of view 1240) of the linear light sensing assembly 1750 so that a representation of the thin-lined illumination pattern 1560 is captured by the area imaging system 1850. In essence, in some embodiments the linear light sensing assembly 1750 may include a thin-lined illumination pattern 1560 and a corresponding linear-type area image sensor 2032 with a linear field of view 1240, and the area imaging system 1850 may include an area image sensor 2032 with an area field of view 2240 and a illumination pattern 2560 larger than that of the linear light sensing assembly 1750 sufficient to capture the thin-lined illumination pattern 1560.

In reference to FIG. 2, in the course of operation of apparatus 1000, signals in the form of analog signal can be read out of image sensor 2032 (whether used in the area light sensing assembly 1850 as shown in FIG. 2 and/or the linear light sensing assembly 1750 (not shown)), converted into digital signals which can be regarded as image data, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 2032 that has been subject to conversion to RAM 1080. In another embodiment, apparatus 1000 can employ a system bus 1040 providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 2032 and RAM 1080 are within the scope and the spirit of the invention.

In one embodiment, the CPU 1060 of the apparatus 1000 is adapted to receive or access image data from the area image system 1850 and subject such image data to image processing to determine the range of the apparatus 1000 from a particular indicia that the user targets, such as the distance between the indicia and the image sensor array 2033 of the area light sensing assembly 1850 and the distance between the indicia and the detector 1026 of the linear light sensing assembly 1750. In one embodiment, the range between the apparatus 1000 and the indicia may be determined from the image data provided by the area light sensing assembly 1850. For example, calculating the area of the representation of the light pattern (e.g., laser beam or illumination) of the linear light sensing assembly 1750 of a particular area frame representing a particular field of view during an exposure period can be utilized to determine the range of the apparatus 1000. In such embodiments, the range may be determined through calculation and/or a lookup table utilizing the area of the light representation. As another example, determining the position or positions of the representation of the light pattern (e.g., laser beam or illumination) of the linear light sensing assembly 1750 of a particular area frame as compared to a particular predetermined point of the area frame representation can be utilized to determine the range of the apparatus 1000. In such embodiments, the range may be determined through calculation and/or a lookup table utilizing the location of the representation of the light pattern, such as through triangulation utilizing the location or locations of the representative of the light pattern (e.g., location of a laser beam or illumination) and the predetermined point. In some embodiments, the predetermined point may be the center of a particular area frame.

Figure 3A:
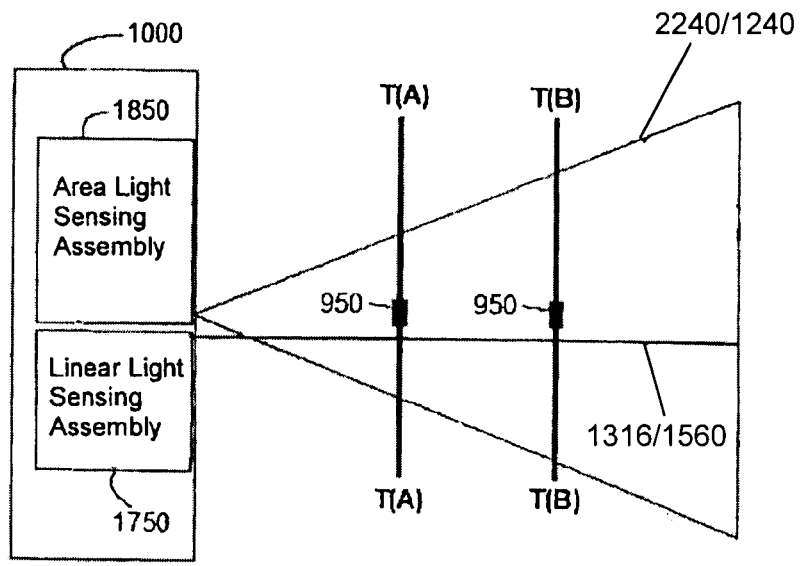
FIGS. 3A-3C is a schematic illustrating the indicia reading apparatus in one embodiment reading indicia at two different ranges.
Figures 3B, 3C:
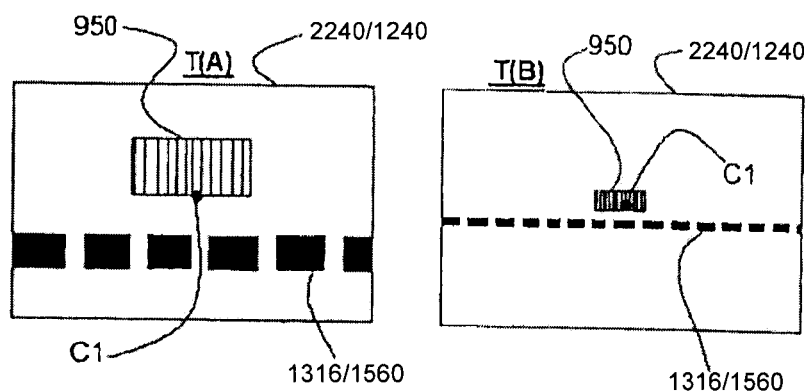

An example of the utilization of the area or location of the representation of the light pattern emitted by the linear light sensing assembly 1750, such as the representation of a laser scan line or static plane/line 1316 of a laser beam or a thin-lined illumination pattern 1560, in an area frame output by the imaging system 1850 to determine the range of the apparatus 1000 is illustrated in FIGS. 3A-3C. As shown in FIGS. 3A-C, the area light sensing assembly 1850 may have a particular field of view 2240 that expands in area with distance from the area light sensing assembly 1850, and the linear light sensing assembly 1750 may emit a light pattern within the field of view 1240/2240 of the area light sensing assembly 1850. As shown in FIG. 3A, a substrate or target T, which includes a decodable indicia 950, may be larger than the field of view 1240/2240 of the area light sensing assembly 1850, at a first location T(A) and a second location T(B) from the apparatus 1000. In the exemplary embodiment shown in FIGS. 3A-C, the first location T(A) of the substrate or target T, and thereby the decodable indicia 950, is closer to the apparatus 1000 than at the second location T(B).

FIGS. 3B and 3C illustrate exemplary representations of area frames of the area light sensing assembly 1850 exposed when the target T and decodable indicia 950 are located at the first location T(A) and second location T(B), respectively, as shown in FIG. 3A. As shown in FIG. 3A, the area of the field of view 2240 at the second location T(B) is larger than the area of the field of view 2240 at the first location T(A). However, as shown in FIGS. 3A and 3B, the representation of the field of view 2240 in the corresponding area frames is the same. As such, as shown in FIG. 3A, the representation of the light pattern emitted by the linear light sensing assembly 1750 when the substrate or target T is positioned at the first location T(A) is relatively thick, and a relatively small amount of its length is represented. Similarly, the representation of the indicia 950 in the area frame is relatively large at the first location T(A) of the target T. Comparatively, as shown in FIG. 3C, at the second location T(B) of the target T the light pattern emitted by the linear light sensing assembly 1750 is relatively thin, and a relatively large amount of its length is represented. Similarly, the representation of the indicia 950 is relatively small at the second location T(B) of the target T. As the projection characteristics of the light pattern of the linear light sensing assembly 1750 are constant (or varies to such a degree that does not significantly affect the calculations), the area of the representation of the light pattern of the linear light sensing assembly 1750 in the image data output by the area light sensing assembly 1850 can be calculated and, based on the area of the representation, referenced to determine the range of the apparatus (e.g., the greater the area of the representation the shorter the range, or the smaller the area of the representation the larger the range).

Similarly, as shown in FIGS. 3A and 3B, the representations of the light pattern emitted by the linear light sensing assembly 1750 and the indicia 950 are located closer to the center C1 of the representation of the field of view 2240 (i.e., area frame) of the area light sensing assembly 1850, and the distance between them has decreased, from the area frames taken when the target T and indicia 950 were located at first location T(A) as compared to the second location T(B). Utilizing this principle, the distance between the representation of the light pattern of the linear light sensing assembly 1750 and a fixed, pre-determined point in the image data output by the area light sensing assembly 1850 can be calculated. For example, as shown in FIGS. 3B and 3C, the distance between the representation of the light pattern emitted by the liner light sensing assembly 1750 and the center C1 of the representation of the field of view 2240 of the area light sensing assembly 1850 has decreased from the first location T(A) of the target T and indicia 950 to the second location T(B). As the center C1 of the representation of the field of view 2240 of the area light sensing assembly 1850 remains constant, the distance between the center C1 of the representation of the field of view 2240 and the representation of the light pattern of the linear light sensing assembly 1750 in the digital signal image data output by the area light sensing assembly 1850 can be calculated and referenced to determine the range of the apparatus 1000 (e.g., the greater the distance the shorter the range, or the smaller the distance the larger the range).

In reference to FIGS. 1 and 2, in some embodiments once the range of the apparatus 100 from a particular indicia 950 has been determined, a gain value for a signal representing the reflected light pattern output from the liner imaging system 1750 and on a signal representing light incident on image sensor array 2033 of the area light sensing assembly 1850 can be determined. For example, a calculation or lookup table may be provided that equates a particular range to specific predetermined gain values for the amplifiers 1029 and 2036 of the liner imaging system 1750 and the area light sensing assembly 1850, respectively, as shown in FIG. 2.

The gain values may be chosen to optimize scan path, plane/line or field of view representing signals output from the liner imaging system 1750 and field of view representing signals output by the area light sensing assembly 1850, and, ultimately, increase the likelihood of indicia reading and improve expected indicia read time, for example. Once the gain values are determined for one or more of the amplifiers 1029 and 2036 of the liner imaging system 1750 and the area light sensing assembly 1850, respectively, the CPU 1060 may signal the interfaces 1028 and 2028 and instruct the amplifiers 1029 and 2036 to apply the gain to signals output from one or more of the respective imaging systems 1750, 1850. For example, once a gain value is determined for the amplifier 1029 of the linear light sensing assembly 1750, the CPU 1060 may signal the interface 1028 and instruct the amplifier 1029 to apply a predetermined range-assisted gain to the image data output from the detector 1029. Similarly, once a gain value is determined for the amplifier 2036 of the area light sensing assembly 1850, the CPU 1060 may signal the interface 2028 and instruct the amplifier 2036 via control circuit 2038 to apply the predetermined range-assisted gain to the image data output from the image sensor 2032.

Referring to further aspects of exemplary apparatus 1000 with respect to FIGS. 1 and 2, imaging lens assembly 2020 (whether used with area light sensing assembly 1850 or linear imaging system 1750) can be adapted for focusing an image of a decodable indicia 950 located within a field of view 1240/2240 on a substrate or target, T, onto image sensor array 2033. A size in target space of a field of view 1240/2240 of apparatus 1000 can be varied in a number of alternative ways. A size in target space of a field of view 1240/2240 can be varied, e.g., by changing the apparatus-to-target distance, changing an imaging lens assembly setting, changing a number of pixels of image sensor array 2033 that are subject to read out, etc. In one embodiment, imaging light rays can be transmitted about imaging axis 2025. Lens assembly 2020 can be adapted to be capable of multiple focal lengths and multiple planes of optimum focus (best focus distances). As such, as shown in FIG. 2 an area light sensing assembly 1850 of apparatus 1000 may include the components within the dashed border referenced as 1850. Similarly, the linear light sensing assembly 1750 of apparatus 1000 may include the components within the dashed border referenced as 1850 (not shown) configured with a linear-type field of view 1240.

As shown in FIGS. 1 and 2, the apparatus 1000 may include an illumination assembly 2500 associated with the area light sensing assembly 1850, such as the area imaging assembly 2100 thereof, for illumination of target, T, and projection of an illumination pattern 2560. In the exemplary embodiment shown in FIGS. 1 and 2, the illumination pattern 2560 may be projected to be proximate to but larger than an area defined by the field of view 2240 of the area light sensing assembly 1850. In the illustrated exemplary embodiment, the height and width of the exemplary projected illumination pattern 2560 are similar in size and larger than that of the field of view 2240 of the area light sensing assembly 1850, such as that of the area imaging assembly 2100. In some embodiments, the exemplary projected illumination pattern 2560 may define an area smaller than an area defined by a field of view 2240 of the area light sensing assembly 1850. Illumination assembly 2500 can include a light source bank 2510, comprising one or more light sources, as shown in FIG. 2. In one exemplary embodiment, an imaging module can be provided having a circuit board carrying image sensor integrated circuit 2040 and lens assembly 2020 disposed in a support disposed on the circuit board. In another exemplary embodiment, illumination assembly 2500 has a light source bank 2510 provided by single light source. In yet another exemplary embodiment, light source bank 2510 can be provided by more than one light source. In some embodiments, at least one of light source may include an LED.

As also illustrated in FIGS. 1 and 2, illumination assembly 2500 may be adapted to take the form of a linear illumination assembly for illumination of target, T, and projection of a linear illumination pattern 1560. Linear illumination pattern 1560, as shown in the exemplary illustrated embodiment, can be projected to be proximate to, but larger than, an area defined by the field of view 1240, 2240 of the area light sensing assembly 1850. In some embodiments, the linear illumination pattern 1560 may be projected in an area smaller than an area defined by the field of view 1240, 2240 of the area light sensing assembly 1850. Linear illumination pattern 1560 may include height and width dimensions that differ, such as the height dimension being substantially less than the width dimension (i.e., a thin-lined illumination). As described above, a linear illumination pattern 1560 may be used in conjunction with an imaging assembly 2100 including a linear-type field of view 1240. As also discussed above, in some embodiments the linear imaging system 1750 may include an imaging assembly 2100 with a linear-type field of view 1240, and may therefore likewise be used in conjunction with an illumination assembly 2500 adapted to project a linear illumination pattern 1560. Such linear illumination pattern 1560 of the linear imaging system 1750 may be captured by the area light sensing assembly 1850 and used to determine the range of the apparatus 100, and therefore range assisted gain control.

In one embodiment, the illumination assembly 2500 (in connection with the linear imaging system 1750 and/or the area light sensing assembly 1850) may include, in addition to light source bank 2510, an illumination lens assembly 2520, as shown in FIG. 2. In addition to, or in place of, illumination lens assembly 2520, illumination assembly 2500 can include alternative light shaping optics, e.g., one or more diffusers, mirrors and prisms. As an example, in embodiments including a linear illumination assembly 2500, the assembly 2500 may include thin-lined laser illumination mechanisms or thin-lined light emitting diodes (LED) for projecting a thin-lined illumination. In use, apparatus 1000 can be oriented by an operator with respect to a target, T, (e.g., a piece of paper, a package, or any other type of substrate) bearing decodable indicia 950 in such manner that illumination pattern 2560 is projected on a decodable indicia 950. In the example of FIGS. 1-3C, decodable indicia 950 is provided by a 1D bar code symbol. Decodable indicia 950 could also be provided by a 2D bar code symbol or optical character recognition (OCR) characters.

In reference to FIG. 2, exemplary light source bank electrical power input unit 2570 can provide energy to light source bank 2510. In one embodiment, electrical power input unit 2570 can operate as a controlled voltage source. In another embodiment, electrical power input unit 2570 can operate as a controlled current source. In another embodiment, electrical power input unit 2570 can operate as a combined controlled voltage and controlled current source. In some embodiments, electrical power input unit 2570 can change a level of electrical power provided to (energization level of) light source bank 2510 via a control circuit 1108, e.g., for changing a level of illumination output by light source bank 2510 of illumination assembly 2500 for generating illumination pattern 2560. For example, in embodiments that utilize the area light sensing assembly 1850 and linear light sensing assembly 17050 to determine the range of the apparatus form an indicia, the range may be utilized to change a level of illumination via a control circuit 1108 according to the particular range.

Apparatus 1000 can include various interface circuits for coupling various peripheral devices to the system address/data bus (system bus) 1400, such as for communication with CPU 1060 (which may be coupled to system bus 1400). For example, as shown in FIG. 2, apparatus 1000 can include an interface circuit 1102 for coupling electrical power input unit 1202 to system bus 1400, and/or an interface circuit 1120 for coupling trigger 1220 to system bus 1400. Apparatus 1000 can also include a display 1222 coupled to system bus 1400 and in communication with CPU 1060, via interface 1122, as well as pointer mechanism 1224 in communication with CPU 1060 via interface 1124 connected to system bus 1400, as shown in FIG. 2. Apparatus 1000 can also include range detector unit 1210 coupled to system bus 1400 via interface 1110. In one embodiment, range detector unit 1210 can be an acoustic range detector unit. Apparatus 1000 can also include interface 1050, e.g., wireline (e.g., USB, Ethernet), or wireless (e.g., IEEE 802.11, Bluetooth) facilitating communication with an external computer, as shown in FIG. 2. Various interface circuits of apparatus 1000 can share circuit components. For example, with reference to FIG. 2 a common microcontroller can be established for providing control inputs to image sensor timing and control circuit 2038, control circuit 1028 and to power input unit 1570, 2570. A common microcontroller providing control inputs to circuit 2038, circuit 1028 and to power input unit 1570 can be provided to set the gain level of the associated amplifiers and/or to coordinate timing between image sensor array controls and illumination assembly controls.

In some embodiments, a succession of frames of image data that can be captured and subject to the described processing can be full frames (including pixel values corresponding to each pixel of image sensor array 2033 (associated with the linear imaging system 1750 and/or the area light sensing assembly 1850) or a maximum number of pixels read out from image sensor array 2033 during operation of apparatus 1000). A succession of frames of image data that can be captured and subject to the described processing may also be "windowed frames" comprising pixel values corresponding to less than a full frame of pixels of image sensor array 2033. A succession of frames of image data that can be captured and subject to the described processing can also comprise a combination of full frames and windowed frames. A full frame can be read out for capture by selectively addressing pixels of image sensor 2032 having image sensor array 2033 corresponding to the full frame. A windowed frame can be read out for capture by selectively addressing pixels of image sensor 2032 having image sensor array 2033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. Apparatus 1000 may include a typical frame rate for capturing a frame utilizing linear imaging assembly 1100, such as a frame rate of more than about 200 frames per second. Similarly, apparatus 1000 may include a typical frame rate for capturing a frame utilizing area imaging assembly 2100, such as a frame rate of about 60 frames per second (FPS)—which translates to a frame time (frame period) of about 16.6 ms. Another typical exemplary frame rate is about 30 frames per second (FPS), which translates to a frame time (frame period) of about 33.3 ms per frame. A frame rate of apparatus 1000 can be increased (and frame time decreased) by decreasing of a frame picture size, for example.

Figure 4:
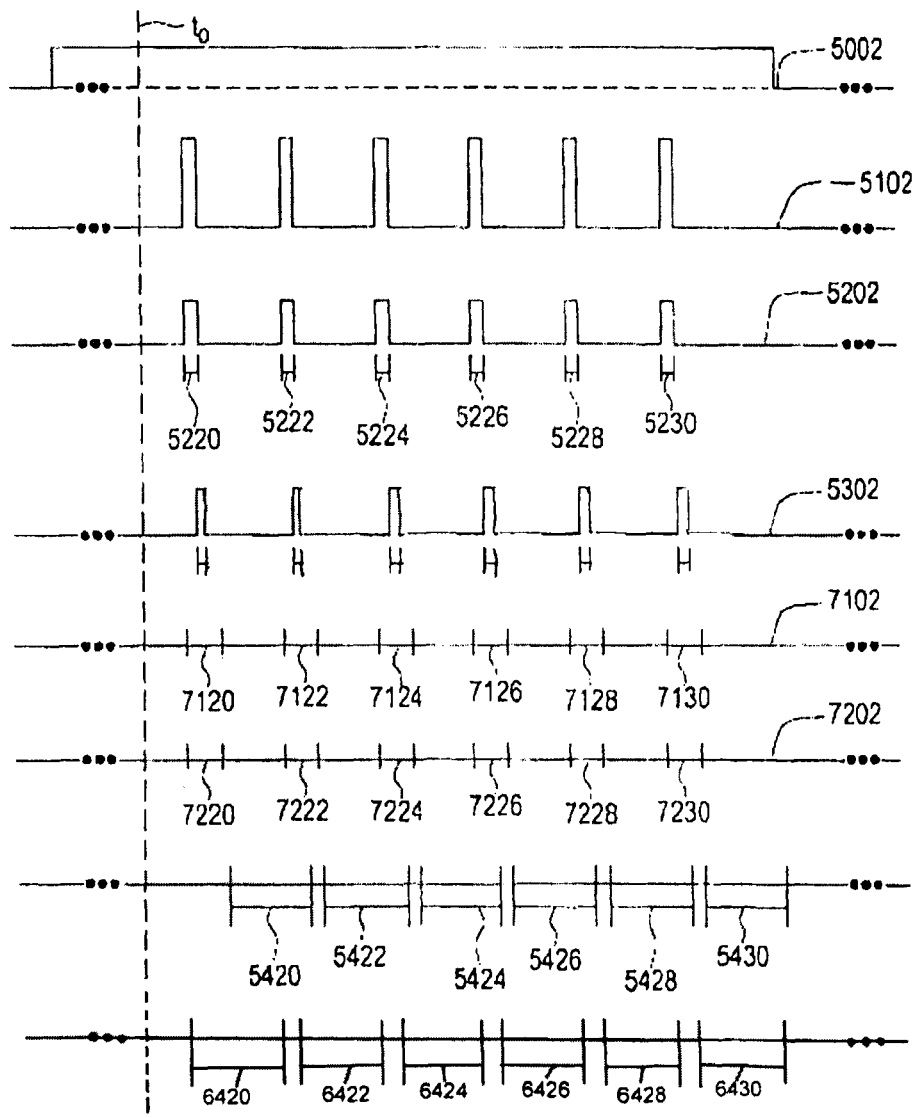
FIG. 4 is a timing diagram illustrating an embodiment of a method which can be performed by an indicia reading apparatus.

A timing diagram illustrating operation of the apparatus 1000 during performance in accordance with various configurations set forth herein is presented as FIG. 4. Referring to the timing diagram of FIG. 4, signal 5002 is a trigger signal which can be made active, e.g., via actuation of trigger 1220, via powering up of apparatus 1000 or by receipt of a serial trigger command by apparatus 1000. In one embodiment of a fixed mount indicia reading terminal, trigger signal 1220 can be regarded as being always active.

Signals 5102, 5202, 5302 are signals for illustrating operation of an area light sensing assembly 1850, such as the area light sensing assembly illustrated in FIG. 2. Signal 5102 is an illumination energization level signal for energizing linear illumination assembly 2500 having varying energization levels, if such illumination assembly 2500 is provided and activated. For example, the range of the apparatus 1000 may be used to determine if the illumination assembly 2500 should be active, and if so, how much illumination should be provided. Signal 5202 is an exposure control signal having active states defining exposure periods 5220-5230 for area image sensor array 2033 and inactive states intermediate the exposure periods. Signal 5302 is a readout control signal for reading out image data, which may be in the form of analog image signals from area image sensor array 2033. When readout control signal 5302 is active, image signals can be read out of area image sensor array 2033. As explained herein, the image data read out of area image sensor array 2033 will contain, in part, data corresponding to the light pattern emitted by the linear light sensing assembly 1750.

Timelines 7102 and 7202 illustrate operation of linear light sensing assembly 1750 in the exemplary case that linear light sensing assembly 1750 is provided by a laser scanning based linear light sensing assembly. Regarding periods 7120-7130, periods 7120-7130 are periods at which light projected by laser diode assembly 1013 is scanned across a target by reflector 1027. As periods 7120-7130 are substantially aligned with the active or exposure periods 5220-5230 of the signal 5202 of the area light sensing assembly 1850 (i.e., light is projected by laser diode assembly 1013 during the exposure periods 7120-7130), periods of laser light 7120-7130 of the linear light sensing assembly 1750 are captured by the area light sensing assembly 1850 during exposure periods 5220-5230. Regarding periods 7220-7230, periods 7220-7230 are periods at which analog signals representative of light reflected from a target is output by detector 1026.

Further regarding the timing diagram of FIG. 4, periods 5420-5430 are periods at which CPU 1060 can process memory stored (e.g., stored in memory 1080) digital signals that were captured utilizing linear light sensing assembly 1750 and periods 6420-6430 are periods at which CPU 1060 can process memory stored (e.g., in memory 1080) digital signals captured utilizing area light sensing assembly 1850. In some embodiments, the digital signals may include digital signals captured utilizing one or more of laser scanning assembly 1016 of the linear light sensing assembly 1750 and circuit components 2032, 2036, 2037, and 2038 of the area light sensing assembly 1850. For example, in regards to the area light sensing assembly 1850, periods 6420-6430 are periods at which CPU 1060 can process frames of image data captured utilizing area imaging assembly 2100 having area image sensor array 2033, e.g., for attempting to decode for decodable indicia 950 and for determining the range of the apparatus from the indicia. In regards to the linear light sensing assembly 1750, periods 5420-5430 and periods 6420-6430 are periods at which CPU 1060 can process signals representative of light reflected from a target output by detector 1026. The processing by CPU 1060 at processing periods 5420-5430 and periods 6420-6430 can include, e.g., processing for attempting to decode for decodable indicia, determining the range of the apparatus from the indicia, determining the appropriate gain values for the amplifiers of the linear and area light sensing assembly and instructing the control circuits of the amplifiers to apply the appropriate gain value to the output signals based on the range. In one embodiment, apparatus 1000 can be operative so that prior to exposure period 5220 and time $t_o$, apparatus 1000 can be capturing "parameter determination" frames that are processed for parameter determination and, in some instances, not subject to a decode attempt. For example, some frames may only be used to determine the range of the apparatus 1000 from an indicia 950, and thus the appropriate gain values to be applied to the output signals of the linear and area light sensing assembly 1750, 1850.

Figure 5:
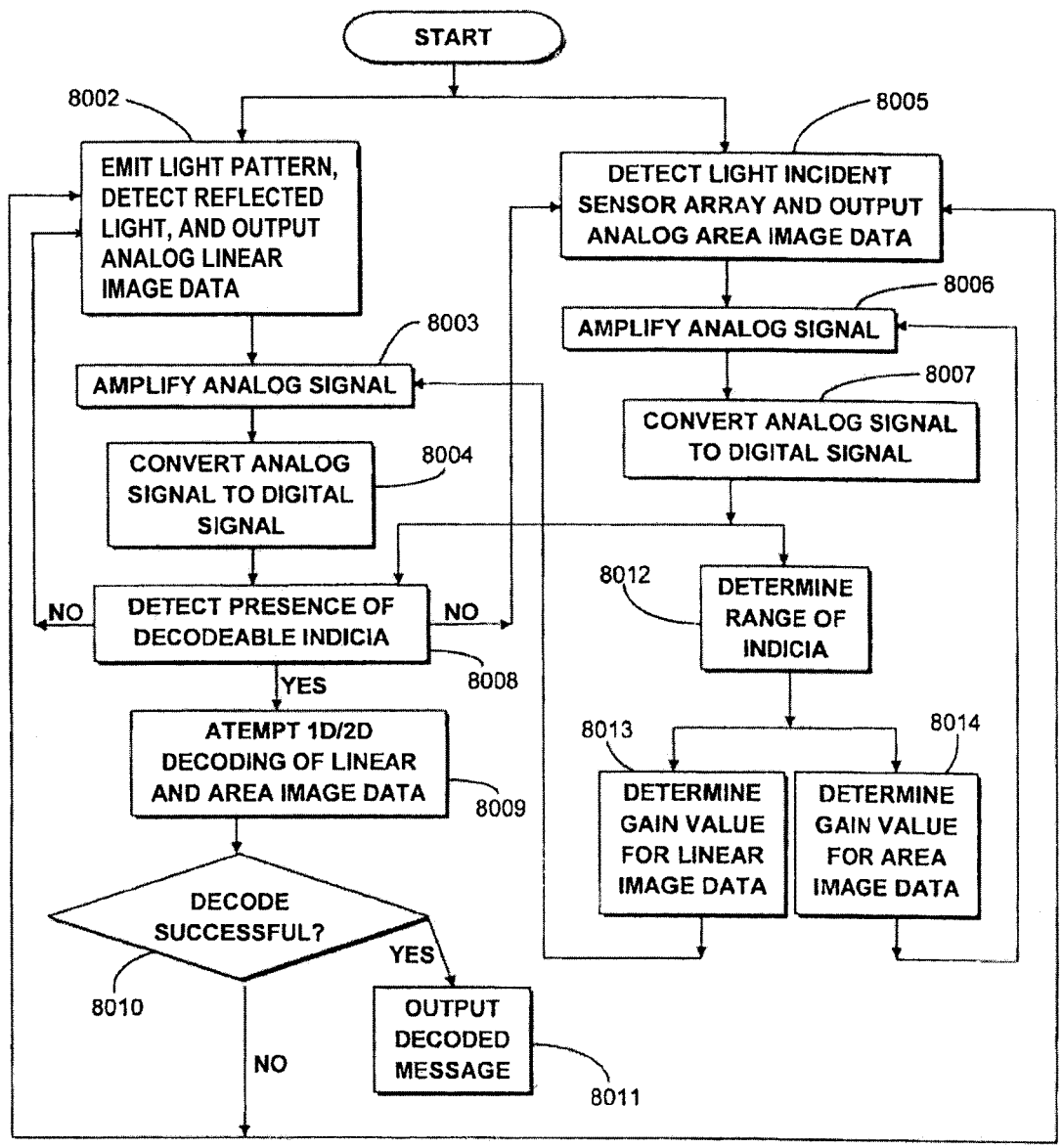
FIG. 5 is a flow diagram illustrating a partial hardware and software operation of an indicia reading apparatus in one embodiment.

The flow diagram of FIG. 5 illustrates operation of indicia reading apparatus 1000 in one embodiment in which indicia reading apparatus 1000 utilizes an area light sensing assembly 1850 and a linear light sensing assembly 1750, and is configured to calculate the range of the apparatus 1000 from an indicia and apply a corresponding gain value to the image data produced by at least one of the area light sensing assembly 1850 and linear light sensing assembly 1750.

The operation of the linear light sensing assembly 1750 is represented by blocks 8002-8004. At block 8002, apparatus 1000 can emit a light pattern (e.g., a laser beam(s) or illumination), detect light reflected back to the apparatus 1000, and output linear signal representing a the light pattern (e.g., a scan path or plane/line 1316 or a field of view 1240, respectively). Where linear light sensing assembly 1750 includes a laser assembly 1016, output linear representing signals can include signals output by photodetector 1026 in the form of an analog signal. Where linear light sensing assembly 1750 includes a linear-type area scanning assembly with a sensor array 2033 an area frame of image data corresponding to light incident the sensor array 2033, in the field of view 1240 thereof may be output. At blocks 8003 and 8004, the output signals can be amplified by amplifier 1029 and converted into digital signals by converter 1037, respectively. The digital signals representing the light pattern detected by the linear light sensing assembly 1750 (e.g., laser light along a scan path or a plane/line 1316 or illumination within a field of view 1560) from block 8004 may then be stored in memory 1080 for processing by CPU 1060.

The operation of the area light sensing assembly 1850 is represented by blocks 8005-8007. At block 8005, apparatus 1000 can output area representing signals. Where area light sensing assembly 1850 includes an area image sensor 2032, the output area representing signals can include an area frame of image data corresponding to light incident the sensor array 2033 in the field of view 1240/2240 of the area light sensing assembly 1850. At blocks 8006 and 8007, the output area representing signals can be amplified by amplifier 2036 and converted into digital signals by converter 2037, respectively. The digital signals from block 8007 may then be stored in memory 1080 for processing by CPU 1060.

At block 8008, apparatus 1000 can process output linear representing and/or area frame representing digital signals from memory 1080 to determine whether a decodable indicia is represented in the output image data (i.e., data output from the linear light sensing assembly 1750 and/or the area light sensing assembly 1850). Apparatus 1000 may process one of the output liner representing digital signals and the output area representing digital signals, or may process both the output linear and the output area image data. Where apparatus 1000 processes both linear representing and area representing digital signals, the apparatus 1000 may do so according to a time management process, such as a procedure where portions of output linear representing and area representing digital signals are alternatingly processed.

In such a manner, apparatus 1000 at block 8008 can determine whether a representation of a decodable indicia has not been detected in the output linear representing and area representing digital signals. If a representation of a decodable indicia has not been detected, apparatus 1000 proceeds back to blocks 8002 and/or 8005 to capture and output linear representing and area representing indicia.

If a representation of a decodable indicia has been detected at block 8008, apparatus 1000 proceeds to block 8009 and attempts to decode the decodable indicia, including 1D symbology and 2D symbology representing digital signals. At block 8010, indicia reading apparatus 1000 can determine whether a decode attempt was successful. If the decode attempt was successful, apparatus 1000 can output a decoded message at block 8011. If the decode attempt was not successful, apparatus 1000 can proceed back to blocks 8002 and 8005 and capture and output further linear representing and area representing signals, respectively, to further read and potentially decode a representation of a decodable indicia. In one embodiment, if the decode attempt was not successful the apparatus may also perform a loss prevention module by archiving the image data containing the non-decodable image data.

Still referring to the flow chart of FIG. 5, the digital signal image data from block 8007 of the area light sensing assembly 1850 may be processed to determine the range of the apparatus 1000 from the target of the apparatus 1000 at block 8012, such as the linear distance between a decodable indicia and the detector 1026 or image sensor array 2033 of the linear light sensing assembly 1750 and/or the image sensor array 2033 of the area light sensing assembly 1850. The range of the apparatus 1000 may be determined from the digital area image data by analyzing the data to determine the area and/or location of the representation of the light pattern (e.g., laser light or illumination) of the linear light sensing assembly 1750, such as through a triangulation calculation utilizing the distance of the light representation with respect to a fixed point of the area frame (e.g., the center of the area frame). At blocks 8013 and 8014, the apparatus 1000 may make use of the range of the apparatus 1000 from the target and determine corresponding gain values for the amplifiers 8003 and 8006 of the output analog linear and area image signals 8002 and 8005, respectively. The gain values for the amplifier 8003 and amplifier 8006 may be determined through the use of a lookup table including gain values for each amplifier 8003, 8006 corresponding to ranges of the apparatus 1000. The gain values for the amplifier 8003 and the amplifier 8006 can be transmitted to the amplifiers 8003 and 8006 via interfaces 1028 and 2028, respectively. As such, after the area light sensing assembly 1850 detects and outputs an initial area frame including a representation of the light of the linear light sensing assembly 1750 at block 8005, and the signal is amplified at block 8006, digitized at block 8007 and stored into memory, the apparatus 1000 can determine the range of the apparatus 1000 at block 8012 and corresponding gain values based on the range at blocks 8013 and 8014. Finally, the apparatus 1000 can apply the range assisted gain values to subsequent signals output by the linear and/or area light sensing assembly 1750 and 1850.

A small sample of systems methods and apparatus that are described herein is as follows:

A1. An indicia reading apparatus comprising:

a linear light sensing assembly, the linear light sensing assembly operative for projection of a light pattern and to detect reflected light, the linear light sensing assembly being operative to output a first signal representing the reflected light, the linear light sensing assembly having a first amplifier for amplification of the first signal;

an area light sensing assembly having an area image sensor array and an imaging lens for focusing an image onto the area image sensor array, the area light sensing assembly having an area field of view and being operative to output a second signal representing reflected light incident on the image sensor array, the area light sensing assembly having a second amplifier for amplification of the second signal;

wherein the indicia reading apparatus is operative for attempting to decode decodable indicia utilizing one or more of the first signal and the second signal; and wherein the indicia reading apparatus is operative so that one or more of a gain of the first amplifier and a gain of the second amplifier is responsive to a representation of the light pattern of the linear light sensing assembly included in the second signal output by the area light sensing assembly.

A2. The indicia reading apparatus of A1, wherein the indicia reading apparatus is operative so that the linear light sensing assembly projects the light pattern within the area field of view of the area light sensing assembly while the area image sensor array detects reflected light incident on the image sensor array.

A3. The indicia reading apparatus of A2, wherein the indicia reading apparatus is operative to determine the range of the apparatus from a decodable indicia by utilizing the second signal to determine the area of the representation of the light pattern in the representation of the area field of view, and wherein one or more of a gain of the first amplifier and a gain of the second amplifier is responsive to the range.

A4. The indicia reading apparatus of A2, wherein the indicia reading apparatus is operative to determine the range of the apparatus from a decodable indicia by utilizing the second signal to determine the location of the representation of the light pattern in the representation of the area field of view, and wherein one or more of a gain of the first amplifier and a gain of the second amplifier is responsive to the range.

A5. The indicia reading apparatus of A4, wherein the location of the representation of the light pattern in the area field of view is utilized to determine the range of the apparatus from a decodable indicia through triangulation of the location of the light pattern with respect to a fixed point in the representation of the area field of view of the area light sensing assembly.

A6. The indicia reading apparatus of A1, wherein the indicia reading apparatus is operative to utilize the representation of the light pattern of the linear light sensing assembly included in the second signal output by the area light sensing assembly to determine the range of the apparatus from a decodable indicia, and wherein one or more of a gain of the first amplifier and a gain of the second amplifier is responsive to the range.

A7. The indicia reading apparatus of A6, wherein one or more of a gain of the first amplifier and a gain of the second amplifier is determined via a lookup table utilizing the range of the apparatus.

A8. The indicia reading apparatus of A1, wherein the area light sensing assembly includes an illumination assembly for projection of an illumination pattern at least partially within the area field of view, and wherein the illumination assembly is responsive to a representation of the light pattern of the linear light sensing assembly included in the second signal output by the area light sensing assembly.

A9. The indicia reading apparatus of A1, wherein the output first signal includes a first analog signal representing the reflected light, and wherein the first amplifier applies a gain to the first analog signal.

A10. The indicia reading apparatus of A9, wherein the output second signal includes a second analog signal representing the reflected light incident on the image sensor array, and wherein the second amplifier applies a gain to the second analog signal.

A11. The indicia reading apparatus of A10, wherein the apparatus is operative to determine the range of the apparatus from a decodable indicia from the representation of the light pattern of the linear light sensing assembly included in the second signal output by the area light sensing assembly, and wherein the gain of the first amplifier and the gain of the second amplifier is responsive to the range.

A12. The indicia reading apparatus of A1, wherein the linear light sensing assembly comprises a laser assembly operative to at least emit laser light for projection of the light pattern and to detect reflected laser light, and wherein the first signal represents the reflected laser light along a scan path or plane.

A13. The indicia reading apparatus of A12, wherein processing for attempting to decode a decodable indicia includes determining whether there is a decodable indicia in the scan path or plane of the linear light sensing assembly.

A14. The indicia reading apparatus of A1, wherein the linear light sensing assembly comprises an illumination assembly for projection of the light pattern as a thin-lined illumination pattern, and an image sensor array and an imaging lens for focusing an image onto the image sensor array, the linear light sensing assembly having a field of view with a height less than a width, and wherein the first signal represents the reflected light of the thin-lined illumination pattern within the field of view and incident on the image sensor array of the linear light sensing assembly.

B1. An indicia reading apparatus comprising:
a first light sensing assembly outputting a first signal and projecting a light pattern, the indicia reading apparatus having a first amplifier capable of amplifying the first signal and utilizing the first signal for attempting to decode a decodable indicia;
a second light sensing assembly outputting a second signal, the indicia reading apparatus having a second amplifier capable of amplifying the second signal and utilizing the second signal for attempting to decode the decodable indicia;
wherein the indicia reading apparatus is operative for processing a signal representing the light pattern to determine the range of the apparatus from the decodable indicia; and
wherein the indicia reading apparatus is operative for utilizing the range of the apparatus for determining a gain applied by one or more of the first amplifier and the second amplifier.

B2. The indicia reading apparatus of B1, wherein the second light sensing assembly is capable of detecting the light pattern of the first light sensing assembly and wherein the second signal is processed to determine the range of the apparatus from the decodable indicia.

B3. The indicia reading apparatus of B2, wherein the first light sensing assembly is a linear light sensing assembly comprising at least one of:
a laser scanning assembly operative to at least emit and scan laser light for projecting the light pattern and to detect reflected laser light, wherein the first signal includes a representation of the reflected laser light along a scan path;
a laser emitting assembly operative to at least emit a static laser light beam focused in one direction and expanded in another direction for projecting the light pattern and to detect reflected laser light, wherein the first signal includes a representation of the reflected static laser light beam; and
an illumination assembly for projecting the light pattern as a thin-lined illumination pattern, and a first image sensor array and a first imaging lens for focusing an image onto the first image sensor array to detect reflected light of the thin-lined illumination pattern, the linear light sensing assembly having a first field of view with a height less than a width, wherein the first signal represents the reflected light of the thin-lined illumination pattern within the first field of view and incident on the first image sensor array.

B4. The indicia reading apparatus of B3, wherein the second light sensing assembly is an area light sensing assembly having a second image sensor array and a second imaging lens for focusing an image within a second field of view onto a second image sensor array, and wherein the second signal includes a representation of the light pattern of the linear light sensing assembly.

B5. The indicia reading apparatus of B4, wherein first signal includes a first analog signal, and wherein the first amplifier is capable of amplifying the first analog signal.

B6. The indicia reading apparatus of B5, wherein second signal includes a second analog signal, and wherein the second amplifier is capable of amplifying the second analog signal.

While the present invention has been described with reference to a number of specific embodiments, it will be understood that the true spirit and scope of the invention should be determined only with respect to claims that can be supported by the present specification. Further, while in numerous cases herein wherein systems, apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A method, comprising:
projecting, with a linear light sensing assembly, a light pattern onto a decodable indicia within a first field of view of a first image sensor;
detecting, with the linear light sensing assembly, light reflected onto the first image sensor from the projected light pattern;
outputting, with the linear light sensing assembly, a first signal representing the reflected light;
amplifying, with a first amplifier of the linear light sensing assembly, the first signal;
detecting, with an area light sensing assembly, light incident on a second image sensor of the area light sensing assembly having a second field of view overlapping the first image sensor's first field of view, the light incident on the second image sensor comprising light from the projected light pattern;

outputting, with the area light sensing assembly, a second signal representing light incident on the second image sensor;

amplifying, with a second amplifier of the area light sensing assembly, the second signal;

determining, with a processor, a range of an apparatus from the decodable indicia from image data based on the second signal, wherein the apparatus comprises the processor, the linear light assembly, and the area light assembly;

determining, with the processor, a gain value for each of the first amplifier and the second amplifier based on the range;

transmitting the determined gain values to the first amplifier and the second amplifier; and attempting, with the processor, to decode the decodable indicia based at least in part on the amplified first signal and/or both the amplified first signal and the amplified second signal.

2. The method of claim 1, wherein determining, with the processor, the range of the apparatus from the decodable indicia comprises determining an area of representation of the light pattern in the second field of view.

3. The method of claim 1, wherein determining, with the processor, the range of the apparatus from the decodable indicia comprises determining a location of representation of the light pattern in the second field of view.

4. The method of claim 1, wherein determining, with the processor, the range of the apparatus from the decodable indicia comprises:

determining a location of representation of the light pattern in the second field of view; and triangulating the location of representation of the light pattern with respect to a fixed point in the representation of the second field of view.

5. The method of claim 1, wherein determining, with the processor, the gain value for each of the first amplifier and the second amplifier based on the range comprises determining each gain value via a lookup table.

6. The method of claim 1, wherein the linear light sensing assembly comprises a laser assembly for projecting laser light as the light pattern.

7. The method of claim 1, comprising capturing a succession of frames with the first image sensor and the second image sensor, wherein the succession of frames comprises full frames, windowed frames, or a combination of full frames and windowed frames.

8. A method, comprising:

projecting, with a linear light sensing assembly, a light pattern onto a decodable indicia within a first field of view of a first image sensor;

detecting, with the linear light sensing assembly, light reflected onto the first image sensor from the projected light pattern;

outputting, with the linear light sensing assembly, a first signal representing the reflected light;

amplifying, with a first amplifier of the linear light sensing assembly, the first signal;

detecting, with an area light sensing assembly, light incident on a second image sensor of the area light sensing assembly having a second field of view overlapping the first image sensor's first field of view at the same time that the linear light sensing assembly is detecting light reflected onto the first image sensor from the projected light pattern;

outputting, with the area light sensing assembly, a second signal representing light incident on the second image sensor;

amplifying, with a second amplifier of the area light sensing assembly, the second signal;

determining, with a processor, a range of an apparatus from the decodable indicia from image data based on the second signal, wherein the apparatus comprises the processor, the linear light assembly, and the area light assembly;

determining, with the processor, a gain value for each of the first amplifier and the second amplifier based on the range;

transmitting the determined gain values to the first amplifier and the second amplifier; and attempting, with the processor, to decode the decodable indicia based on the amplified first signal and/or the amplified second signal.

9. The method of claim 8, wherein determining, with the processor, the range of the apparatus from the decodable indicia comprises determining an area of representation of the light pattern in the second field of view.

10. The method of claim 8, wherein determining, with the processor, the range of the apparatus from the decodable indicia comprises determining a location of representation of the light pattern in the second field of view.

11. The method of claim 8, wherein determining, with the processor, the range of the apparatus from the decodable indicia comprises:

determining a location of representation of the light pattern in the second field of view; and triangulating the location of representation of the light pattern with respect to a fixed point in the representation of the second field of view.

12. The method of claim 8, wherein determining, with the processor, the gain value for each of the first amplifier and the second amplifier based on the range comprises determining each gain value via a lookup table.

13. The method of claim 8, wherein the linear light sensing assembly comprises a laser assembly for projecting laser light as the light pattern.

14. The method of claim 8, comprising capturing a succession of frames with the first image sensor and the second image sensor, wherein the succession of frames comprises full frames, windowed frames, or a combination of full frames and windowed frames.

15. A method, comprising:

projecting, with a linear light sensing assembly, a light pattern onto a decodable indicia within a first field of view of a first image sensor and simultaneously detecting light reflected onto the first image sensor from the projected light pattern;

outputting, with the linear light sensing assembly, a first signal representing the reflected light;

amplifying, with a first amplifier of the linear light sensing assembly, the first signal;

converting the amplified first signal into a first digital signal;

detecting, with an area light sensing assembly, light incident on a second image sensor of the area light sensing assembly having a second field of view overlapping the first image sensor's first field of view at the same time that the linear light sensing assembly is detecting light reflected onto the first image sensor from the projected light pattern;

outputting, with the area light sensing assembly, a second signal representing light incident on the second image sensor;

amplifying, with a second amplifier of the area light sensing assembly, the second signal;

converting the amplified second signal into a second digital signal;

determining, with a processor, a range of an apparatus from the decodable indicia from the second digital signal, wherein the apparatus comprises the processor, the linear light assembly, and the area light assembly;

determining, with the processor, a gain value for each of the first amplifier and the second amplifier based on the range;

transmitting the determined gain values to the first amplifier and the second amplifier; and attempting, with the processor, to decode the decodable indicia based on the first digital signal and/or the second digital signal.

16. The method of claim 15, wherein determining, with the processor, the range of the apparatus from the decodable indicia comprises determining an area of representation of the light pattern in the second field of view.

17. The method of claim 15, wherein determining, with the processor, the range of the apparatus from the decodable indicia comprises determining a location of representation of the light pattern in the second field of view.

18. The method of claim 15, wherein determining, with the processor, the range of the apparatus from the decodable indicia comprises:

determining a location of representation of the light pattern in the second field of view; and triangulating the location of representation of the light pattern with respect to a fixed point in the representation of the second field of view.

19. The method of claim 15, wherein determining, with the processor, the gain value for each of the first amplifier and the second amplifier based on the range comprises determining each gain value via a lookup table.

20. The method of claim 15, comprising capturing a succession of frames with the first image sensor and the second image sensor, wherein the succession of frames comprises full frames, windowed frames, or a combination of full frames and windowed frames.

* * * * *